US009892064B2

(12) United States Patent
Holzbecher et al.

(10) Patent No.: US 9,892,064 B2
(45) Date of Patent: Feb. 13, 2018

(54) UNIVERSAL INPUT DEVICE

(71) Applicant: Logitech Europe S.A., Lausanne (CH)

(72) Inventors: Jiri Holzbecher, Binningen (CH);
Mathieu Meisser, La Conversion (CH);
Philippe Chazot, Saint-Jorioz (FR);
Ana Milosevic, Chavannes-près-Renens (CH); Pascal Strahm, Crassier (CH);
Olivier Dumont, Morges (CH);
Tzu-Pin Lin, Taipei (TW)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 14/474,967

(22) Filed: Sep. 2, 2014

(65) Prior Publication Data
US 2016/0062923 A1    Mar. 3, 2016

(51) Int. Cl.
*G06F 13/10* (2006.01)
*G06F 13/42* (2006.01)
*G06N 7/00* (2006.01)
*H04W 4/00* (2009.01)

(52) U.S. Cl.
CPC .......... *G06F 13/102* (2013.01); *G06F 13/105* (2013.01); *G06F 13/4282* (2013.01); *G06N 7/005* (2013.01); *H04W 4/008* (2013.01)

(58) Field of Classification Search
CPC ...... G06F 13/102; G06N 7/005; H04W 4/008
See application file for complete search history.

(56) References Cited

U.S. PATENT DOCUMENTS

| | | | | |
|---|---|---|---|---|
| 2003/0212779 A1* | 11/2003 | Boyter | ................ | H04L 12/2697 709/223 |
| 2005/0108614 A1* | 5/2005 | Huntly-Playle | ..... | G06F 11/1443 714/776 |
| 2008/0266256 A1* | 10/2008 | Lee | .......................... | G06F 3/033 345/163 |
| 2012/0054372 A1* | 3/2012 | Chen | ..................... | G06F 9/4415 710/13 |

(Continued)

FOREIGN PATENT DOCUMENTS

| | | |
|---|---|---|
| CN | 105389020 | 3/2016 |
| EP | 2770440 A1 | 8/2014 |
| WO | WO2013167615 A1 | 11/2013 |

OTHER PUBLICATIONS

Extended European Search Report for European patent application EP15183163.3 (Dec. 3, 2015).

(Continued)

*Primary Examiner* — Idriss N Alrobaye
*Assistant Examiner* — Ronald Modo
(74) *Attorney, Agent, or Firm* — Kilpatrick Townsend & Stockton LLP

(57) ABSTRACT

Embodiments of the invention are directed to input devices configured for use with computing devices. The present invention relates to methods and devices for establishing, maintaining and managing, wireless connections between an input device and one or more host computing devices running one of a plurality of operating systems. The input device may be configured to analyze data received from the host computing devices to automatically or manually determine an operating system running on the host computing devices and configure the input device for proper functionality with the determined operating system.

15 Claims, 11 Drawing Sheets

(56) References Cited

U.S. PATENT DOCUMENTS

2012/0281143 A1\* 11/2012 Chow .................. H04N 5/4403
348/563
2014/0035945 A1\* 2/2014 Anglin ...................... G06F 3/14
345/619

OTHER PUBLICATIONS

Zagg (2005-2014). "Universal Versatile Tablet and Phone Keyboard," located at http://www.zagg.com/universal-tablet-keyboard/8100, last visited on Oct. 6, 2014, 5 pages.
First Office Action for European patent application EP15183163.3 dated Dec. 7, 2016, 4 pages.

\* cited by examiner

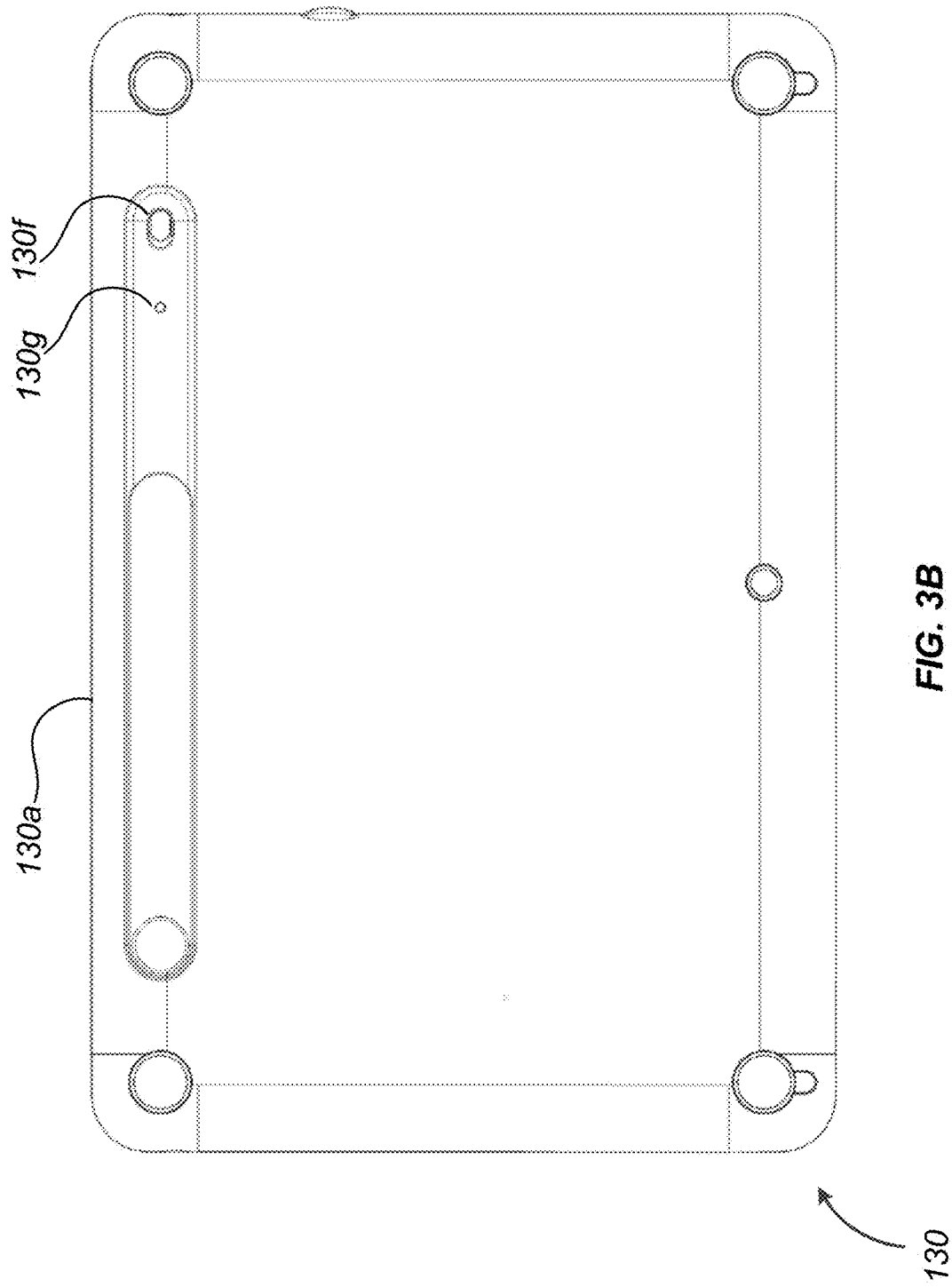

| indicator | note | MacOSX | iOS | Windows | Android | Linux | ChromeOS |
|---|---|---|---|---|---|---|---|
| exact name comparison | Nexus5, Nexus7 | 0 | 0 | 0 | 95 | 0 | 0 |
| string search | "iPod", "iPhone", "iPad" | 0 | 95 | 0 | 0 | 0 | 0 |
| string search | "MacBook" | 95 | 0 | 0 | 0 | 0 | 0 |
| pattern matching | SM-CNNN (e.g., SM-P900, SM-T700, SM-T531, SM-T805) | 0 | 0 | 0 | 80 | 0 | 0 |
| pattern matching | Nexus/ | 0 | 0 | 0 | 80 | 0 | 0 |

*FIG. 4A*

| indicator | note | MacOSX | iOS | Windows | Android | Linux | ChromeOS |
|---|---|---|---|---|---|---|---|
| service presence | MFi (BT) | 0 | 100 | 0 | 0 | 0 | 0 |
| service presence | ANCS (BLE) | 0 | 100 | 0 | 0 | 0 | 0 |

*FIG. 4B*

| indicator | note | MacOSX | iOS | Windows | Android | Linux | ChromeOS |
|---|---|---|---|---|---|---|---|
| active pipes | Absence of mouse collection on iOS | 0 | 100 | 0 | 0 | 0 | 0 |
| active pipes | Apple Notification Center Service (ANCS) | 0 | 100 | 0 | 0 | 0 | 0 |
| active pipes | Android Wear | 0 | 0 | 0 | 100 | 0 | 0 |

*FIG. 4C*

UNIVERSAL INPUT DEVICE

BACKGROUND OF THE INVENTION

Despite the common use of touchscreen technology in computing devices, many users still prefer to use a physical input device (e.g., keyboard, mouse) for data entry into their computing devices. For some, virtual keyboards that are provided on computing devices can be inconvenient or difficult to use. For example, the virtual keyboard on a smart phone may be too small for entering significant amounts of text via the virtual keyboard. Similarly, some users may prefer to use other types of input devices, such as a wireless mouse or touchpad, to interact with and navigate the display screen of computing devices.

It is also typical for users to have a multitude of computing devices that they use on a regular basis, and even simultaneously. For example, a single user may have a desktop, laptop, smart phone, and tablet computer. Each of these devices may also be running a different operating system (OS) (e.g., Microsoft Windows, Apple iOS, Apple Mac OSX, Android, Linux, ChromeOS).

As a result, users may often interface with more than one of these computing devices at a time. For example, a user may be using a laptop computer for business purposes and a tablet computer for entertainment purposes. It would be cumbersome for a user to carry separate input devices for each computing device and physically move from one input device connected to one computing device to second input device connected to a second computing device in order to utilize both computing devices. Some alternatives allow reusing a single input device for data entry to multiple computing devices. However, these solutions are not without their drawbacks.

In prior solutions, the input device could be paired with computing devices operating different operating systems. However, in these solutions, each time the user wanted to change the host computing device, or host, paired with the input device, the user would be required to toggle a switch on the input device to select the appropriate operating system of the computing device, and then go through a discovery and pairing process with the computing device.

While these input devices may be convenient for pairing with and connecting to one computing device at a time, switching connections between multiple computing devices can present their own share of difficulties. For example, each time the user may want the connection switched between computing devices, the reconnection process has to be performed. If the user often switches between computing devices, this can become an inconvenient experience for the user.

In addition, in prior solutions, a standard input device would be paired with the host computing device without any regard for what operating system was running on the host computing device. While different operating systems may have different functionalities (and different operations based on key selection), prior solutions did not address this, resulting in improper or incorrect mapping of key inputs to operating system instructions.

Based on the foregoing, there is a need in the art for improved methods and systems to be able to use an input device with multiple computing devices running different operating systems.

SUMMARY OF THE INVENTION

The present invention relates generally to input devices, such as human interface devices, configured for use with electronics or computing devices. More specifically, the present invention relates to methods and systems for using a single input device (e.g., keyboard, mouse, or touchpad devices) with multiple host computing devices that may be running different operating systems, and efficiently switching the single input device between the multiple host computing devices.

The present invention further relates to automatically detecting a type of operating system that the host computing device is running based on the detection and analysis of one or more host computing device indicators. Examples of host computing device indicators may include, but are not limited to, host computing device name, services offered to the input device by the host computing device, and active pipes (e.g., data connections) between the host computing device and the input device. In some embodiments of the present invention, the input device may analyze the host computing device indicators to make a determination as to the operating system of the host computing device.

The present invention further provides the ability to send keycodes corresponding to the determined operating system, which allows the input device to provide greater functionality and a better user experience over prior art. By configuring the input device to be able to send operating system-specific instructions/commands, the functionality of specific keys can be altered depending on the operating system.

Embodiment of the present invention may provide a method of establishing a wireless connection between a data input device and a host computing device. The method comprises receiving, by an input module, data indicating the selection of the host computing device. The method further comprises initiating, by a communications module, a pairing process with the host computing device through a data communications connection. The method further comprises receiving, by the communications module, one or more host computing device indicators from the host computing device, and analyzing the one or more host computing device indicators to automatically determine an operating system associated with the host computing device. When the operating system associated with the host computing device is automatically determined, the method further comprises associating the determined operating system with the selected host computing device.

In some embodiments, the method may further comprise, establishing the data communications connection between the host computing device and the data input device, and storing data indicating the determined operating system and data communications connection between the host computing device and the data input device.

In some embodiments, analyzing the one or more host computing device indicators to automatically determine the operating system associated with the host computing device may further comprise, determining a probability of the operating system associated with the host computing device based on the one or more host computing device indicators, and comparing the determined probability with a predetermined threshold. In such embodiments, the host computing device may be automatically determined when the determined probability exceeds the predetermined threshold. The host computing device indicators may include device name, active data pipes data, device drivers data, and services running on the host computing device.

In some embodiments, associating the determined operating system with the selected host computing device may further comprise sending a set of keycodes from the data input device to the host computing device, wherein the set of keycodes are associated to the determined operating system.

In some embodiments, the method may further comprise, associating a default operating system with the selected host computing device when the operating system associated with the host computing device is not automatically determined.

In some embodiments, the method may further comprise, receiving, by the input module, data indicating the selection by a user of the operating system running on the host computing device when the operating system associated with the host computing device is not automatically determined In some embodiments, the method further comprises determining a customized mapping of a set of input members disposed on the data input device based on the determined operating system and host computing device specific data.

In some embodiments, the data communications connection is one of a Bluetooth™ and Bluetooth LE™ communications protocol.

In some embodiments, the data input device is one of a keyboard, a mouse, or a touchpad device.

Embodiments of the present invention may further provide a system comprising a host computing device, the host computing device running an operating system, and a data input device, wherein the data input device is connected to the host computing device. The data input device may be connected to the host computing device using a method comprising, receiving, by an input module, data indicating the selection of the host computing device. The method further comprises initiating, by a communications module, a pairing process with the host computing device through a data communications connection. The method further comprises receiving, by the communications module, one or more host computing device indicators from the host computing device, and analyzing the one or more host computing device indicators to automatically determine an operating system associated with the host computing device. When the operating system associated with the host computing device is automatically determined, the method further comprises associating the determined operating system with the selected host computing device.

Embodiment of the present invention may provide a method of establishing a wireless connection between a data input device and a host computing device. The method comprises receiving, by an input module, data indicating the selection of the host computing device. The method further comprises initiating, by a communications module, a pairing process with the host computing device through a data communications connection. The method further comprises receiving, by the input module, data indicating the selection of a first operating system running on the host computing device, and associating the first operating system with the selected host computing device.

In some embodiments, the method further comprises receiving, by the input module, data indicating the selection of a second operating system. The method further comprises associating the second operating system with the selected host computing device while maintaining the wireless connection between the data input device and the host computing device.

In some embodiments, initiating the pairing process with the host computing device through the data communications connection may further comprise detecting, by the input module, a selection of one of a plurality of operating system selection keys, wherein a length of time of the selection exceeds a predetermined threshold.

In some embodiments, associating the first operating system with the selected host computing device may further comprise, sending a set of keycodes from the data input device to the host computing device, wherein the set of keycodes are associated with the first operating system.

In some embodiments, the data indicating the selection of the first operating system running on the host computer device is received via a user input.

In some embodiments, receiving data indicating the selection of the first operating system may further comprise, analyzing one or more host computing device indicators to automatically determine the operating system associated with the host computing device.

Embodiment of the present invention may provide a method of establishing a wireless connection between a data input device and a host computing device. The method comprises receiving, by the input module, data indicating the selection of a first operating system running on the host computing device, and associating the first operating system with the selected host computing device.

These and other embodiments of the invention along with many of its advantages and features are described in more detail in conjunction with the text below and attached figures.

BRIEF DESCRIPTION OF THE DRAWINGS

FIG. 3B is a bottom view of a keyboard device according to an embodiment of the present invention.

FIGS. 4A-4C illustrate examples of host operating system indicators according to an embodiment of the present invention.

DETAILED DESCRIPTION OF SPECIFIC EMBODIMENTS

Embodiments of the invention are generally directed to systems and methods for operating a universal wireless input device. Embodiments are described with respect to a multi-universal wireless input device in the form of a computer keyboard device. However, embodiments of the invention are not limited to input devices in the form of computer keyboard devices. Other embodiments contemplate input devices in other forms, including, but not limited to, mouse input devices and touchpad input devices.

Embodiments of the invention are also directed to automatically determining an operating system running on a paired host computing device by analyzing host operating system indicators received during a pairing process between the host computing device and the input device.

I. Exemplary Systems

Figure 1:
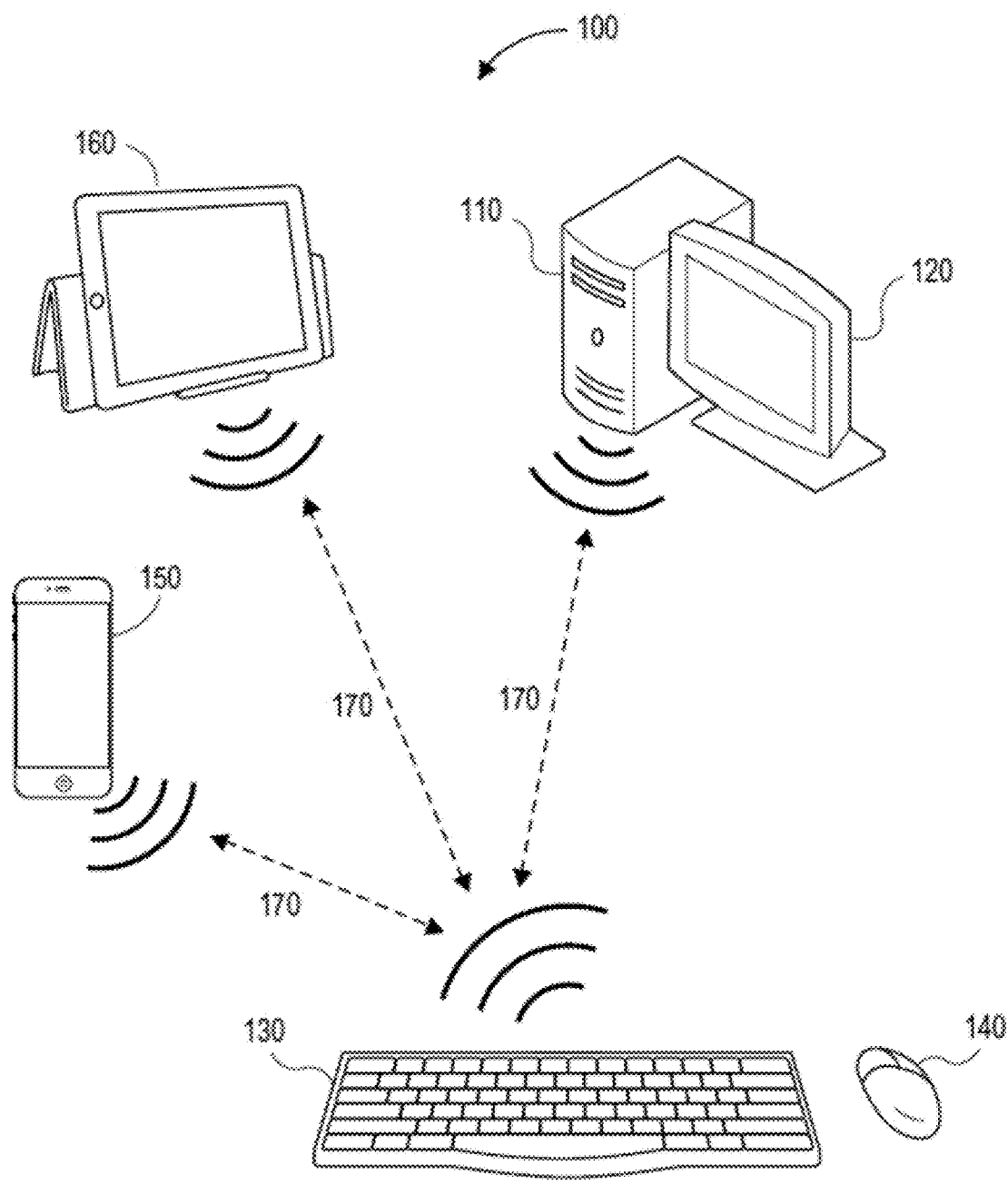
FIG. 1 is a diagram of a computer system according to an embodiment of the present invention.

FIG. 1 is a diagram of a computer system 100 according to an embodiment of the present invention. Computer system 100 includes a computer 110, a monitor 120, a keyboard device 130, and a mouse input device 140. In some embodiments, the mouse input device 140 is a multi-modal mouse input device. In some embodiments, input device may refer to either or both the keyboard device 130 and a mouse input device 140. In some embodiments, the input device may also be referred to as a data input device. For computer system 100, the keyboard device 130 and mouse input device 140 are configured to control various aspects of computer 110 and monitor 120. Computer 110 may include a non-transitory computer-readable storage medium (not shown) that is configured to store computer code, such as keyboard driver software, mouse input device driver software, and the like, where the computer code is executable by a processor (not shown) of the computer 110 to affect control of the computer 110 by the mouse input device 140 and keyboard device 130. In some embodiments, the keyboard device 130 and the mouse input device 140 may be hardwired, wirelessly coupled, or integrated into the computer 110 (e.g., a touchpad region on the computer 110).

In addition to providing data input to a computer system 100, the keyboard device 130 can be utilized in any number of configurations and systems (e.g., personal computers, servers, terminals, etc.) as would be appreciated by one of ordinary skill in the art. For example, the keyboard device 130 may wirelessly connect to and provide input to a smart phone 150 and/or a tablet computer 160. The computer 110, smart phone 150 and tablet computer 160 may be collectively or individually referred to as host computing devices.

FIG. 1 illustrates the keyboard device 130 with pairings to the smart phone 150, the tablet computer 160, and computer 110 over wireless connections 170. In some embodiments, the wireless connections 170 may use a Bluetooth™ connection. Bluetooth™ is a wireless technology standard for exchanging data over short distances between fixed and mobile devices. Some embodiments can include other means for providing short-range contact or contactless communications capability, such as RFID, infra-red, or other data transfer capability that can be used to exchange data between the keyboard device 130 and the host computing device. In other embodiments, communications between the keyboard device 130 and the host computing device may be conducted using a communications protocol. For example, the communications protocol may be operating at 2.4 GHz or 5.8 GHz.

Figure 2:
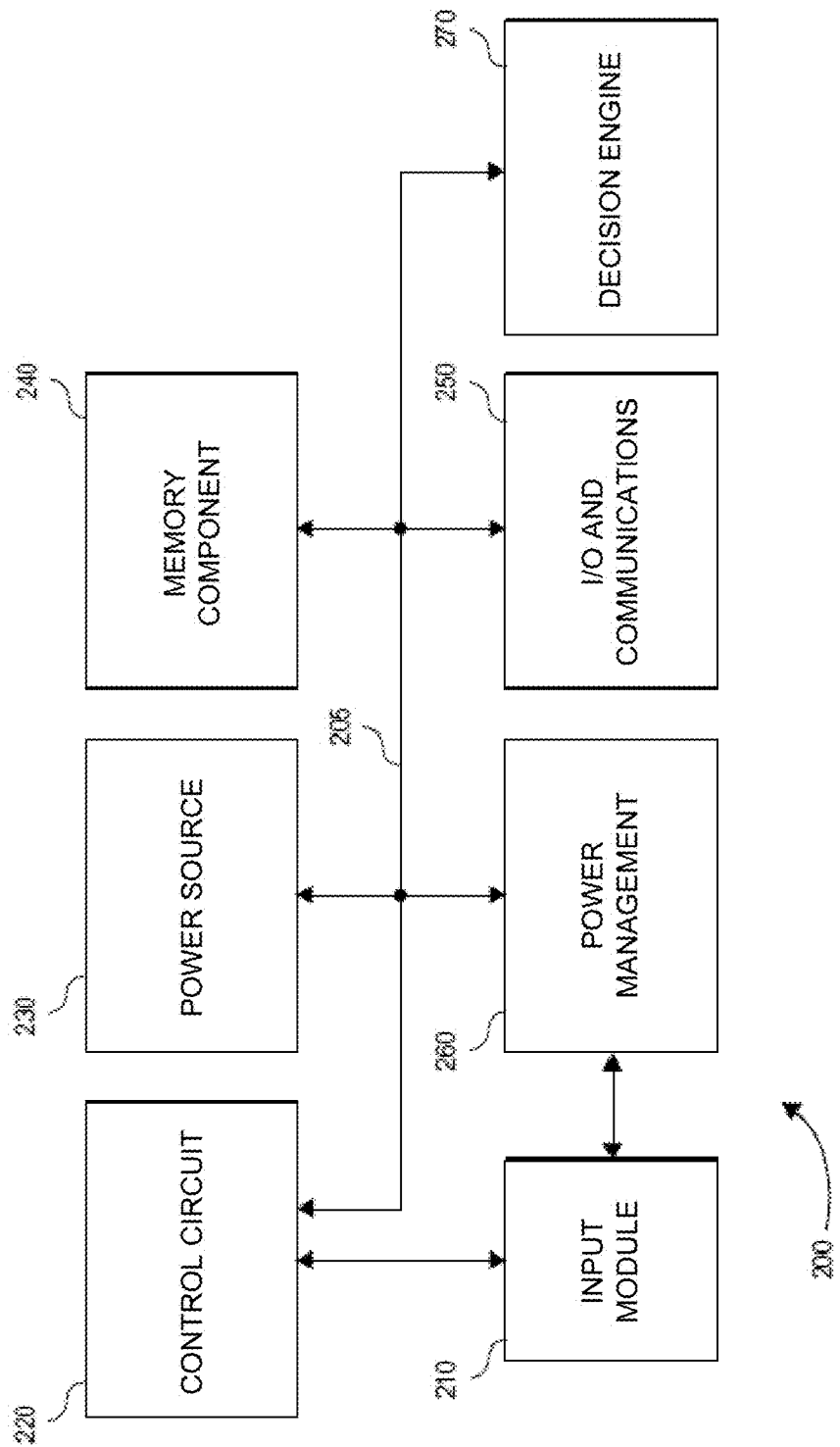
FIG. 2 is a simplified block diagram of an input device according to an embodiment of the present invention.

FIG. 2 is a simplified block diagram of an input device 200 according to an embodiment of the present invention. The input device 200 may be in the form of a keyboard device 130. In other embodiments, the input device 200 may be a keyboard device 130, a mouse input device 140, touchpad device, stylus device, or any other device that can provide inputs to a host computing device. The input device 200 may include a bus 205, an input module 210, a control circuit 220, a power source 230 configured to provide power to the input device 200, a memory component 240, an input/output (I/O) and communications system 250, a power management system 260, and a decision engine 270. In some embodiments, the control circuit 220, power source 230, memory component 240, input/output (I/O) and communications system 250, power management system 260, and the decision engine 270 may be in electronic communication with one another via the bus 205. The input module 210 may be independently connected to the control circuit 220 and power management block 260. In some embodiments, the input module 210 may be connected to the other modules via the bus 205. It should be noted that many other bus 205 configurations for an input device may be used that may include or exclude any of the various system elements shown in FIG. 2, as would be known by one of ordinary skill in the art.

In some embodiments, the input module 210 may be configured to receive inputs from a plurality of keystroke input elements or devices. In such embodiments, the input module 210 may be operable to receive input in response to a user pressing an alphanumeric key (e.g., QWERTY keys, function keys, numeral or number pad keys, operating system selection keys, etc.), or other suitable input element or device such as a media control button, voice-over-internet-protocol (VoIP) button, touch sensors (e.g., touch pads) and the like. The input module 210 may be capable of generating character data associated with the pressed keystroke input elements and sending the character data to the control circuit 220.

In embodiments of the present invention, the keycodes sent to the host computing device by the input device 200 are dependent on the operating system running on the host computing device. The behavior of the input device 200 is dependent on the operating system. Different keycodes corresponding to the plurality of keystroke input elements may be operating system-specific. For example, selecting the "Home" key results in different functions on different operating systems (e.g., the Home Screen in iOS, the Home Page in the Internet Explorer browser in Windows). The ability to send keycodes corresponding to the determined operating system allows the input device 200 to provide greater functionality and a better user experience.

In some embodiments, the input module 210 may receive inputs in response to a user rotating an input element in the form of a host selector dial 130b. In such embodiments, the position of the host selector dial 130b may be an indicator to the input module 210 of a user selection (e.g., a selection of a host computing device the input device is connected to). In other embodiments, the input element used for host selection may be in additional forms, including, but not limited to, a switch.

In some embodiments, the control circuit 220 may comprise one or more microprocessors (μCs), and the control circuit 220 is configured to control the operation of input device 200. Alternatively, the control circuit 220 may include one or more microcontrollers (MCUs), digital signal processors (DSPs), field programmable gate arrays (FGPA), programmable logic devices (PLDs), or the like, with supporting hardware/firmware (e.g., memory, programmable I/Os, etc.), as would be appreciated by one of ordinary skill in the art with the benefit of this disclosure. Alternatively, MCUs, μCs, DSPs, and the like, may be configured in other system blocks of system 100, outside of input device 200. For example, a microprocessor in computer 110 can be configured to process keyboard input commands from the input module 210 via a wireless or hardwired connection.

The memory component 240 may be configured to store data. In some embodiments, the data may include connection and pairing data including, for example, the address of the selected host computing device. In some embodiments, the memory component 240 may be a non-volatile memory. The connection and pairing data may be stored in the memory component 240 even when the keyboard device 130 is powered down, such that when the keyboard device 130 is reactivated, the previously stored pairing data may be restored (e.g., the previously stored data may be used to re-establish the connection between the input device and the host(s)).

The I/O and communications block 250 may be configured to provide input/output capabilities to the input device 200. For example, the I/O and communications block 250 can route data from the input module 210 to the computer system 100, and from the computer system 100 to the input module 210, via a hardwire link or wireless connection. The I/O and communications block 250 can route alphanumeric key data, number pad key data, operating system selection data, host selection data, media control data, VoIP data, touch sensor data, and the like, to the computer 110 for further processing. The wireless connection can be Bluetooth™ or any other wireless standard or proprietary wireless network protocol. In some embodiments, the communications block 250 can maintain a wireless connection with multiple hosts such as host computing devices 110, 150, and 160 of FIG. 1, either with one host computing device a time or with multiple host computing devices at the same time. In some embodiments, even where the connection is maintained with multiple host computing devices at the same time, the input data may only be sent to one host computing device at a time (e.g., the host computing device currently selected with the host selector dial 130b).

The power management block 260 may be configured to manage the electrical power supplied by the power source 230 (e.g., batteries, solar panels). In some embodiments, the power management block 260 can route power directly from the power source 230 to the other components of the input device 200. The power management block 260 can further distribute power from the power source 230 to the other system components (e.g., control circuit 220, I/O and communications block 250 and the input module 210, or any combination thereof).

In some embodiments, the input device 200 can utilize other energy sources in addition to the power source 230, including but not limited to, a USB power source, an AC or DC power source, or the like as would be understood by one of ordinary skill in the art. In some embodiments, the input device 200 may receive electrical power from a plurality of sources.

The decision engine 270 may comprise code for determining the operating system running on a host computing device. In some embodiments, the input device 200 may receive or retrieve a plurality of host operating system indicators (which may also be referred to as host computing device indicators) from the host computing device. The plurality of host operating system indicators may be processed by the decision engine 270 and the control circuit 220. In some embodiments, the decision engine 270 may be programmed with an algorithm for analyzing the one or more host operating system indicators to determine the operating system. In some embodiments, the algorithm may weigh each host operating system indicator uniformly. In some embodiments, the decision engine 270 may be programmed to weigh each host operating system indicator differently based on a probability associated with each host operating system indicator on how likely the host operating system indicator indicates one operating system over another operating system.

In some embodiments, the algorithm for analyzing the host operating system indicators may be modified and updated (e.g., via a firmware update).

The input device 200 may also include a non-transitory computer-readable storage medium comprising a plurality of computer-readable instructions tangibly embodied on the computer-readable storage medium, executable by a data processor.

Figure 3A:
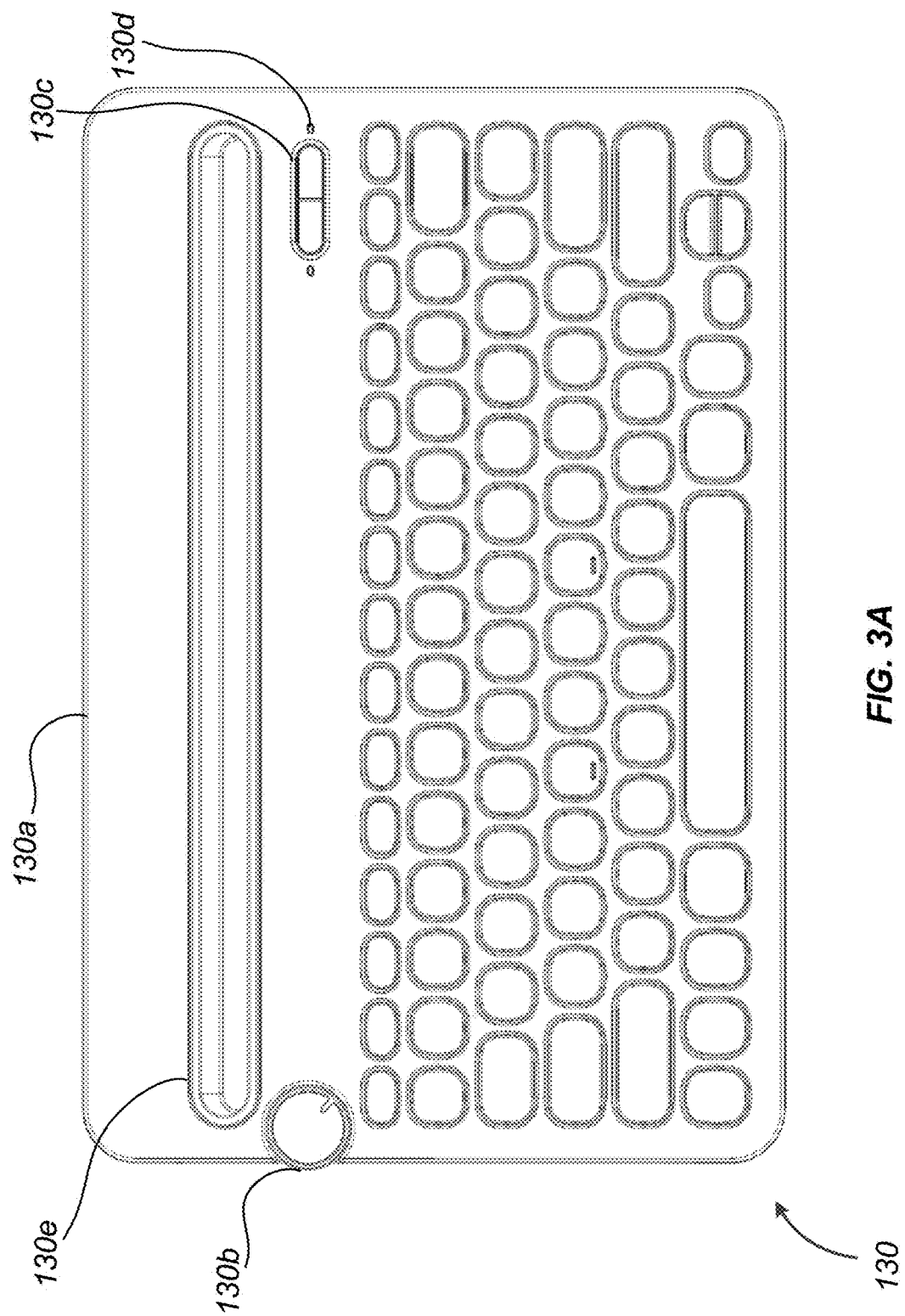
FIG. 3A is a top view of a keyboard device according to an embodiment of the present invention.

FIG. 3A is a top view of keyboard device 130 according to an embodiment of the present invention. The input device in FIG. 3A is in the form of a keyboard device 130. In other embodiments, the input device may be a mouse input device, a touchpad device, a stylus, etc. The keyboard device 130 may include a keyboard housing 130a (which can also be referred to as a housing), a host selector dial 130b, operating system selection keys 130c, and a concavity 130e (e.g., slot) in the keyboard housing 130a configured to hold a host computing device (e.g., a smart phone 150, a tablet computer 160).

In some embodiments, the concavity 130e may be configured to hold more than one host computing device. The shape and length of the concavity 130e in the keyboard housing 130a is for illustrative purposes only. The shape of the keyboard housing 130a is for illustrative purposes only. In some embodiments, the shape of the concavity 130e and the keyboard housing 130a may be different from that depicted in FIG. 3A. In some embodiments, the concavity 130e may be sized to different types of host computing device from different manufacturers.

Figure 3C:
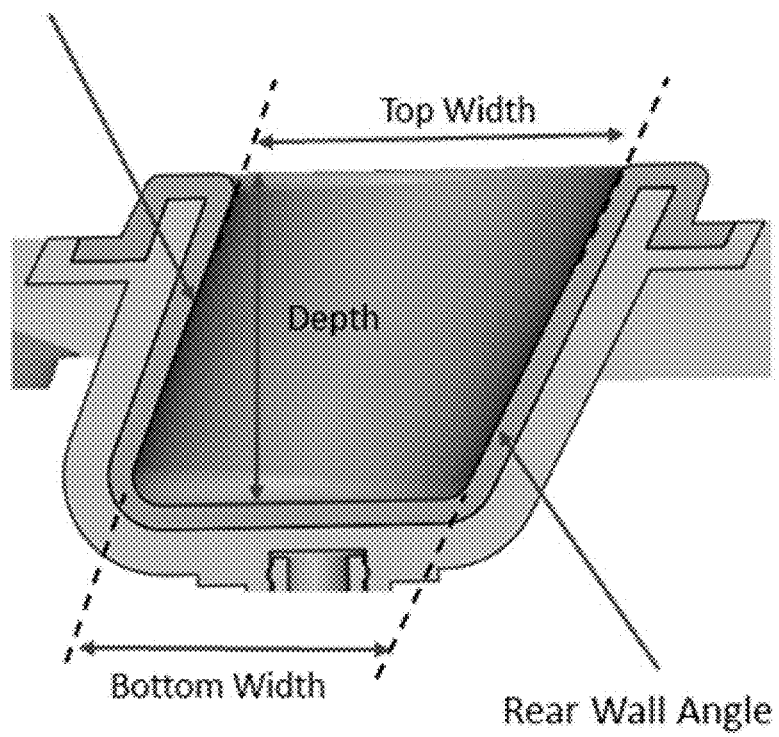
FIG. 3C is a cross-sectional view of a concavity portion of a keyboard device according to an embodiment of the present invention.

FIG. 3C is a cross-sectional view of a concavity portion 130e of a keyboard device 130 according to an embodiment of the present invention. The walls of the concavity 130e may be angled to hold the host computing device between an angle of 45 degrees and 70 degrees. In some embodiments, the angles of the walls of the concavity 130e may be different angles or the same angles. For example, an angle of the front wall of the concavity 130e (e.g., the wall closer to the input members) may be 70 degrees, while an angle of the rear wall of the concavity 130e (e.g., the wall further away from the input members) may be 66 degrees. The angles of the front wall and the rear wall of the concavity 130e may be different angles that would allow the host computing device, when inserted in the concavity 130e to be held at an angle away from a user using the host computing device.

In some embodiments, the length of the concavity 130e may be 260 mm. In some embodiments, the width of the concavity 130e may be 12.7 mm. In some embodiments, the concavity 130e may taper as the depth increases. For example, the width of the concavity 130e may be 12.7 mm at the top of the concavity 130e and 10.6 mm at the bottom of the concavity 130e. In some embodiments, the depth of the concavity 130e may be 11 mm.

In some embodiments, the concavity 130e may be formed by an injected molding process. In some embodiments, the concavity 130e may be formed by a double injected molding process with a softer or pliable material (e.g., rubber) layer overlain on a plastic molding material.

In addition, a plurality of input members or input keys may also be disposed on the surface of the keyboard housing 130a. The plurality of input members may include alphanumeric keys, VoIP control keys, media control keys, function keys, number pad keys, and the like. The layout of the input keys shown in FIG. 3A is merely for illustration. In some embodiments, the layout of the input keys may be different from the layout shown in FIG. 3A.

The keyboard device 130 may support wireless communication (e.g., Bluetooth™ Bluetooth LE™, infrared (IR), radio frequency (RF), and the like). Some embodiments may have one or more hardwired connections for data transfer (e.g., USB, FireWire, etc.) and/or external power sources (e.g., USB, AC adapter, etc.).

In some embodiments, the host selector dial 130b and the operating system selection keys 130c may be used to manage wireless connections between the keyboard device 130 and one or more of a plurality of host computing devices (e.g., the computer 110, the smart phone 150, the table computer 160). In some embodiments, the operating system selection keys 130c may be also be used to initiate the process of connecting the keyboard device 130 and the host computing device. For example, the operating system selection keys 130c may also be Bluetooth™ communication keys that, when selected, may begin the pairing process between the keyboard device 130 and the host computing device and select the operating system running on the host computing device.

In some embodiments, the host selector dial 130b may be used to select a host (e.g., to select from one of a plurality of data stored in the memory component 240 of the keyboard device 130 associated with a different host). In some embodiments, the host selector dial 130b may be movable between two or more positions, with each position of the host selector dial 130b indicating and representing a connection with a different host computing device. In some embodiments, host indicators (e.g., "1", "2", "3", etc.) may be printed on the keyboard housing 130a, each host indicator denoting the host currently selected by the host selector dial 130b.

In other embodiments, the operating system selection keys 130c may be part of the host selector dial 130b. In such embodiments, a first position may correspond to a host with a first predetermined operating system (e.g., Windows), a second position may correspond to a host with a second predetermined operating system (e.g., iOS). In some embodiments, the number of host selectors and the predetermined operating system associated with each host selector may not be limited (e.g., two or more host selectors may correspond to the Windows operating system).

In other embodiments, a source of sensory feedback is associated with each of the plurality of hosts. In some embodiments, a light source such as a light emitting diode (LED) may provide sensory feedback to the user. In some embodiments, a plurality of light sources may be embedded in the keyboard housing 130a. In such embodiments, an activated LED may indicate the selected host. In other embodiments, the sensory feedback is in the form of an auditory or tactile feedback (i.e., a different sound or vibration may be emitted for each of the plurality of hosts to indicate which is active).

In other embodiments, a liquid-crystal display (LCD) may be disposed on or in the keyboard housing 130a. In such embodiments, when a host is selected, the LCD may display the host that is selected and active. In some embodiments, the LCD may display the name of the host computing device and/or the type of operating system (e.g., Android, Windows, iOS) running on the host computing device connected to the keyboard device 130. In such embodiments, the name of the host computing device may be received by the I/O and communications system 250 of the keyboard device 130 via a wireless connection with the host computing device. In some embodiments, the name of the host displayed on the LCD may be customizable by a user (e.g., by entering a name using the alphanumeric input members on the keyboard device 130). In such embodiments, the name of the host may be customized by the user during the first connection of the host computing device to the keyboard device 130.

In other embodiments, managing the multiple pairings may be conducted using a capacitive touch region. In such embodiments, the capacitive region may be activated by the detected presence of the user in proximity to the capacitive region, or by the physical touch of the user's finger on the capacitive touch region. Specific portions of the capacitive region may be designated for different pairings. In such embodiments, rather than depressing a physical key, the user can place their finger close to or on a region and the input module 210 in the keyboard device 130 can detect that the user wants to pair with the host computing device associated with the selected region of the keyboard device 130.

The host selector dial 130b, or alternatively, the selector switch or capacitive region, may be disposed on any part of the surface of the keyboard device 130, or other input devices (e.g., mouse input device 140 or touchpad device), to allow the user to access and manage the connections between the keyboard device 130 and the multiple host computing devices.

In some embodiments, the keyboard device 130 may be configured to automatically determine the operating system on a host computing device. In such embodiments, the manual selection of one of the operating system selection keys 130c may not be required.

In other embodiments, the operating system selection keys 130c may be used to select a type of operating system running on a host computing device as part of the pairing process. The operating system selection keys 130c may include a plurality of input elements, each input element associated with a different operating system. For example, one operating system selection key 130c may be for pairing with a host computing device running Windows, while another operating system selection key 130c may be for pairing with a host computing device running iOS.

In some embodiments, one of the plurality of operating system selection keys 130c may be selected to initiate a pairing process. By selecting an operating system selection keys 130c, the keyboard device 130 may be placed into a discoverable mode. When the keyboard device 130 is in the discoverable mode, the keyboard device 130 may be detected by one or more host computing devices. When the keyboard device 130 is selected for pairing while in discoverable mode, the host computing device and the keyboard device 130 may be paired. In some embodiments, the pairing process may involve the exchange of a passkey or other authentication value between the host computing device and the keyboard device 130. In some embodiments, the exchange may only be required to be performed once, with future connections and authentications performed automatically.

In some embodiments, each input element may also be associated with an LED indicator light 130d. The LED indicator light 130d may provide sensory feedback to indicate that the keyboard device 130 is in a discovery process or is currently paired to a host computing device. For example, when the LED indicator light 130d is blinking, it may indicate the keyboard device 130 is in a discovery process, and when the indicator light 130d is switched on continuously, it may indicate the keyboard device 130 is paired to a host computing device. In other embodiments, the sensory feedback may be provided by other means, including a LCD display or an auditory feedback.

In some embodiments, the display may be an active (OLED or LCD) display or an electronic paper (black/white) passive display.

In some embodiments using an active display, the display may be hidden under the frame of the keyboard device 130 and be visible only when lit. The display may be active while the keyboard device 130 is in discoverable mode. The indicator may be an icon representing the type of host computing device connected (i.e., a symbol of a tablet or desktop computer) or a textual indication (i.e., "iPad™"). The display may also indicate the status of Bluetooth™ connections (or other communication protocols). For example, the Bluetooth™ connection status could display one of the following messages: "Connecting", "Connected", "Connection Failed", or "Switching Host computing devices."

The active display and the indicator may be active for a predefined period of time (i.e., a timeout period), in order to lower energy consumption. When the keyboard device 130 is switched on, the active display may display the current host computing device paired with the keyboard device 130.

In other embodiments using a passive electronic paper display, the display may be always active but updated/refreshed only during the discovery mode. The indicators may be as described above with respect to embodiments with an active display. In some embodiments, when the passive electronic paper display is not displaying pairing or connecting information, as described above, the display can be used to provide other information, including current time, current temperature, battery usage, etc.

In some embodiments, the display is activated when the host selector dial 130b is moved, when the keyboard device 130 is powered on, or when the keyboard device 130 is coming out of a low power mode caused by user inactivity.

FIG. 3B is a bottom view of a keyboard device 130 according to an embodiment of the present invention. The keyboard device 130 may include a power switch 130f and a power source indicator 130g. The power switch 130f and power source indicator 130g may be disposed on the surface or partially within the keyboard housing 130a.

II. Automatic Mode

In some embodiments of the present invention, when the keyboard device 130 is being paired to a new host, the keyboard device 130 may begin a process to automatically determine a type of operating system running on the host computing device (e.g., computer 110, smart phone 150, tablet computer 160) associated with the host indicator, and once determined, automatically configure the keyboard device 130 for operations with the determined operating system. Embodiments of the present invention are discussed with respect to an input device in the form of a keyboard device 130. However, other embodiments may contemplate the use of other input devices in a similar manner, including a mouse input device 140, a touchpad or a touchscreen device.

In some embodiments, once the discoverable process is initiated between the keyboard device 130 and the host computing device, the keyboard device 130 may receive data from the host computing device via the input/output (I/O) and communications system 250. The data from the host computing device may include host operating system indicators, which also be referred to as host-type indicators. Examples of host operating system indicators may include: a device name, services running on the host computing device, active data pipes, device drivers data, and a custom pattern. The decision engine 270 may use one or more of the host operating system indicators to determine what operating system is running on the host computing device. In some embodiments, the decision engine 270 may evaluate each available or received host operating system indicator and assign a probability as to the level of assurance that the each host operating system indicator indicates one operating system over another operating system.

In some embodiments, the decision engine 270 may evaluate each host operating system indicator until a determination can be made. In such embodiments, once a determination is made, the decision engine 270 may stop evaluating host operating system indicators, even if additional host operating system indicators are available. In some embodiments, a determination may be made by the decision engine 270 when the probability calculated by the decision engine 270 reaches a minimum threshold. In some embodiments, the decision engine 270 may iteratively analyze each available host operating system indicator until the minimum threshold is achieved.

In some embodiments, the presence of a particular host operating system indicator may be a clear indicator that a particular operating system is running on the host computing device. (e.g., 100% probability). Similarly, a particular host operating system indicator may be a clear indicator that a particular operating system is not running on the host computing device (e.g., 0% probability). Other host operating system indicators may only provide partial certainty as to the operating system (e.g., 1%-99% probability). For example, a device name containing "iPhone" or "iPad" would indicate with a high degree of probability that the host computing device is running the iOS operating system, and would indicate with a low degree of probability that the host computing device is running the Windows operating system.

A. Host Name Matching

Device name matching may identify the operating system running on the selected host using a combined search for specific identifiers within the host name that might permit the determination of the operating system. Typically, default host names adhere to a specific pattern chosen by each manufacturer. For example, some manufacturers may include a device type identification in the device name (e.g., Jack's iPod, Jack's iPhone), while other manufacturers may include specific model names in the device name (e.g., Nexus5, Nexus7) or use a specific pattern (e.g., SM-P900, SM-T800).

As illustrated in FIG. 4A, the process of device name matching may be based on exact name comparison, a string search, or pattern matching. For example, an exact name comparison for "Nexus5" may provide 95% probability that the matching device is running the Android operating system. Similarly, a string search comparison for "iPod" may provide 95% probability that the matching device is running the iOS operating system, while the string search comparison for "MacBook" may provide 95% probability that the matching device is running the Mac OSX operating system. A pattern matching search for "NexusN," where "N" is a variable number, may provide 80% probability that the matching device is running the Android operating system. The probabilities shown in FIG. 4A are exemplary and may be based on predetermined probabilities. In some embodiments, the probabilities may be modified by a user or by a manufacturer. In some embodiments, the probabilities may be automatically updated based on pairing processes performed by the keyboard device 130. Additional examples are depicted in FIG. 4A. However, embodiments of the present invention are not limited to the examples in FIG. 4A.

B. Services on Host Computing Device Matching

Each host computing device may have a specific set of services that are offered to an input device that is connected or paired to the host computing device. The specific set of services may be different based on the type of operating system. The decision engine 270 may use data from the host computing device indicating the services offered by the host computing device in determining the type of operating system running on the host computing device.

For example, as illustrated in FIG. 4B, the host computing device may offer Apple-proprietary services like MFi (Made for iPhone/iPod/iPad) or ANCS (Apple Notification Center Service). In such a situation, the likelihood of these services being offered by another operating system may be low. The presence of one or both of these services would provide a strong probability that the device is running the iOS or Mac OSX operating systems. Additional examples are depicted in FIG. 4B. However, embodiments of the present invention are not limited to the examples in FIG. 4B.

In some embodiments, the presence of a combination of standardized protocols may be sufficient to exclude specific operating systems.

C. Active Pipes Matching

Active pipes represent active data connections that have been established between the keyboard device 130 and the operating system running on a host. In some embodiments, as different operating systems have different capabilities and needs, the set of active data communications channels may be different depending on the operating system. In some embodiments, pipes that are active or inactive may provide information to allow the decision engine 270 to include or exclude particular operating systems.

For example, as illustrated in FIG. 4C, where the host computing device has an active communications channel for "Android Wear", it may provide 100% probability that the matching device is running the Android operating system. In another example, the absence of mouse collection may be indicative of an iOS operating system as other operating systems (e.g., Windows, MacOSX, Chrome and Android) would typically choose to receive mouse data. Additional examples are depicted in FIG. 4C. However, embodiments of the present invention are not limited to the examples in FIG. 4C.

D. Custom Patterns Matching

In some embodiments, the host computing device may implement a specific usage of standard human interface device (HID) messages such as "Set report" and "Set feature", where the host computing device may generate a pattern that is unique to that operating system. This could be detected by the input/output (I/O) and communications system 250 of the keyboard device 130 as an indicator of the presence of a particular operating system.

For example, a host computing device may use a series of keyboard LEDs as a pattern, such as "turn ON the Caps Lock LED, turn on the Num Lock LED, and turn on the Scroll Lock LED." Where this pattern is specific to a particular operating system, the decision engine 270 may determine that the host computing device is running the particular operating system.

In some embodiments, the patterns may be implemented by a manufacturer of an operating system.

E. Device Drivers and Specific Applications Matching

In some embodiments, on host computing devices that load a device driver to communicate with an input device (e.g. the keyboard device 130), the detection of a particular device driver may be used by the decision engine 270 to determine the operating system running on the host computing device. In some embodiments, the device driver may notify the keyboard device 130 which operating system the host computing device is running. In some embodiments, this may occur during the device discoverable and pairing process.

For example, when a dongle using a 2.4 GHz proprietary protocol is connected to a host computing device (e.g., plugged into the host computing device), the corresponding device driver may be loaded by the host computing device. The dongle using the 2.4 GHz proprietary protocol may detect the operating system running on the host operating system from the running device driver and may communicate this information to every input device that connects to the dongle. The dongle may communicate the information via a unique command or message to the input devices.

F. Fallback Procedure

In some embodiments, where a determination cannot be made based on the host operating system indicators, the keyboard device 130 may select an operating system based on a fallback procedure. In some embodiments, the fallback procedure may be triggered when the probability level determined by the decision engine 270 fails to reach a minimum threshold to make a determination.

In some embodiments, an input device may have a default operating system to which it will be configured. The default operating system may be based on the type of host computing device the input device will typically be used for. For example, an input device in the form of a tablet keyboard device may have the iOS operating system as the default, while a mouse input device may have the Windows operating system as the default.

In some embodiments, the default operating system may be determined based on operating system grouping. In such embodiments, if a single operating system cannot be determined, the decision engine 270 may select between operating system families. For example, Windows, Linux, Android, and ChromeOS may be associated as Operating System Family #1, and Mac OSX and iOS may be associated as Operating System Family #2. As shown in FIG. 3A, two operating system selection keys 130c are provided: one for Operating System Family #1, and the other one for Operating System Family #2. It would be understood by one of ordinary skill in the art that the number of groups is not limited and that in other embodiments, the operating system families may include different groupings and/or a greater number of groups.

In some embodiments, when the operating system associated with the host computing device cannot be automatically determined, the user can manually select the operating system using the operating system selection keys 130c. In such embodiments, the input module 210 in the keyboard device 103 may receive data indicating the selection by the user of the operating system running on the host computing device

III. Manual Mode

In some embodiments of the present invention, when the keyboard device 130 is switched on or the host selector dial 130b is moved from a first host indicator to a second host indicator, the keyboard device 130 may be placed into a discoverable mode. When in the discoverable mode, the type of operating system running on a host computing device (e.g., computer 110, smart phone 150, tablet computer 160) associated with the second host indicator, may be manually selected by the user using the operating system selection keys 130*c*. Once the operating system is manually selected, the keyboard device 130 may be configured to operate with the selected operating system. Embodiments of the present invention are discussed with respect to an input device in the form of a keyboard device 130. However, other embodiments may contemplate the use of other input devices in a similar manner, including a mouse input device 140 and touchpad or touchscreen devices.

In some embodiments, the operating system selection keys 130*c*, as shown in FIG. 3A, may include two input members, where a first operating system selection key is associated with a first group of operating systems (i.e., Windows, Android) and a second operating system selection key is associated with a second group of operating systems (i.e., Apple, iOS, Max OSX). It would be understood by one of ordinary skill in the art that the number of groups is not limited and that in other embodiments, the operating system groups may include different groupings and/or a greater number of groups.

In some embodiments, the operating system selection keys 130*c* may be linked to the pairing connection function of the keyboard device 130. For example, the operating system selection keys 130*c* may also be Bluetooth™ communication keys that may be used to initiate a pairing process between the keyboard device 130 and the host computing device.

In some embodiments, the manual mode can be used to select a correct operating system in situations where the automatic operating system determination process results in an incorrect determination. In such embodiments, while the keyboard device 130 may be properly paired with the host computing device via the wireless communication, the operating system determined may not be the correct operating system. In such embodiments, the user may select the correct operating system using the operating system selection keys 130*c* without interrupting the wireless connection to the host computing device. In such embodiments, the keyboard device 130 may then send the keycodes associated with the correct operating system to the host computing device to allow proper functionality and mapping between the input members of the keyboard device 130 and the correct operating system.

In other embodiments, the manual mode can be used in a similar manner to select a different operating system upon a conscious decision from the user, in situations where the host computing device may be running multiple instances of different operating system environments such as in the case of Virtual Machine usage. In such situations, the keyboard device 130 may be operable to work with the multiple operating system environments by allowing the user to manually select the appropriate operating system required at a given time.

IV. Exemplary Methods

Figure 5:
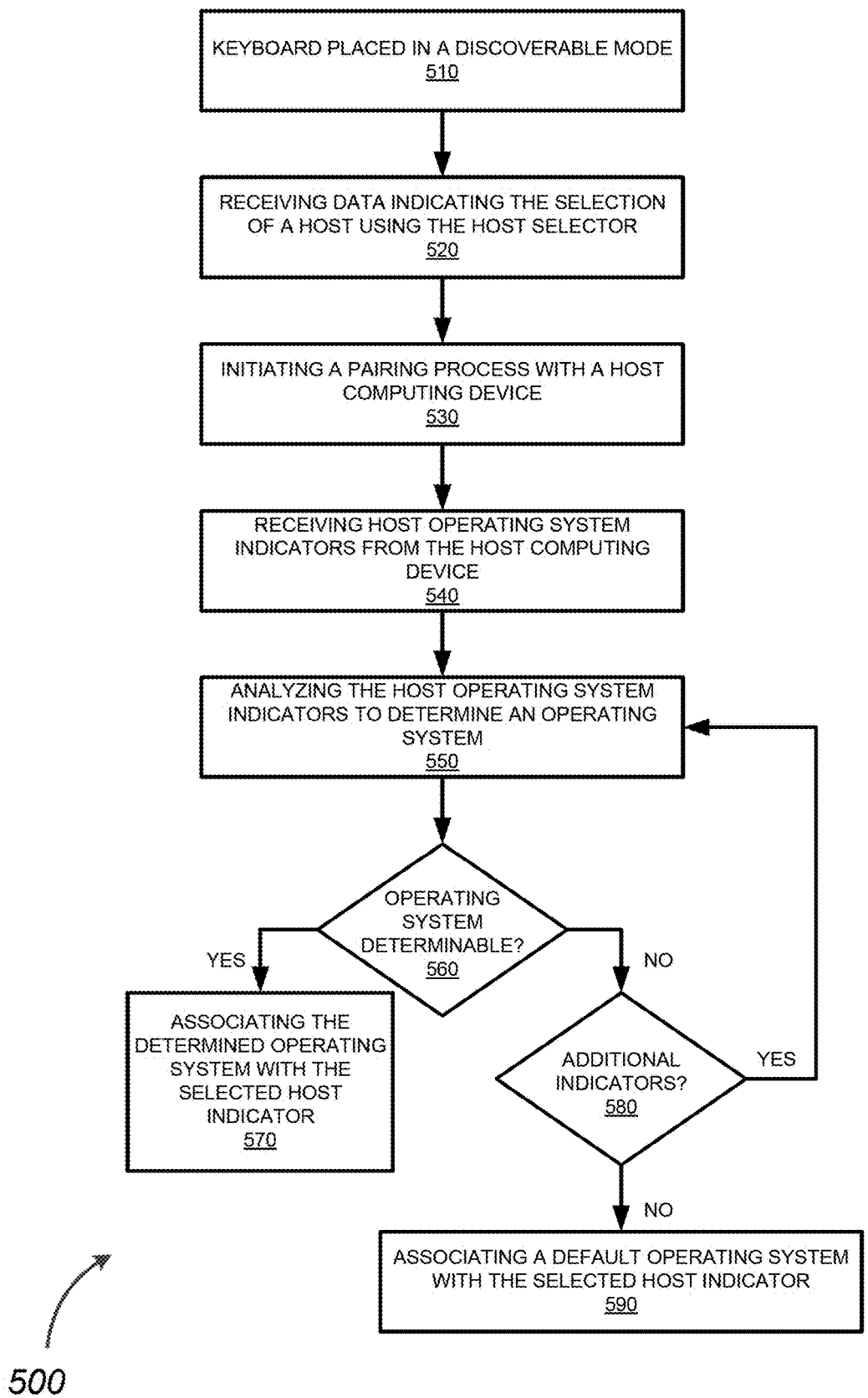
FIG. 5 is a flow diagram for establishing a pairing and connection between a keyboard device and a host computing device using an automatic operating system determination.

FIG. 5 is a flow diagram for establishing a pairing and connection between a keyboard device 130 and a host computing device using an automatic operating system determination.

In step 510, the keyboard device 130 receives data indicating that the keyboard device has been placed in a discoverable mode for pairing the keyboard device 130 with a host computing device (e.g., a computer 110, a smart phone 150, a tablet computer 160). In some embodiments, powering on the keyboard device 130 may place the keyboard device 130 automatically in the discoverable mode.

In step 520, the keyboard device 130 receives data indicating a selection of a host using the host selector dial 130*b*. In some embodiments, the selected host may be the host selected by the host selector dial 130*b* prior to powering on the keyboard device 130. In some embodiments, after the power-up sequence has completed and the keyboard device 130 is in use, the user may move the host selector dial 130*b* from a first host indicator to a second host indicator. The data indicating the selection of a host using the host selector dial 130*b* may be received via an input module 210 in the keyboard device 130.

In step 530, the keyboard device 130 initiates a pairing process with the host computing device. In some embodiments, the I/O and communications block 250 may be configured to establish a connection between the keyboard device 130 and the host computing device. In some embodiments, the pairing process may be to establish a wireless connection between the keyboard device 130 and the host computing device. In some embodiments, the wireless connection can be Bluetooth™ or any other wireless standard or proprietary wireless network protocol.

In some embodiments, the user may have to interact with the host computing device to initiate a connection with the keyboard device 130. For example, the user may have to input a code into the host computing device to confirm that the user wants to pair the keyboard device 130 with the host computing device. The user may be required to access settings in the host computing device and select the keyboard device 130 from a list of available devices. In other embodiments, the user does not have to interact with the host computing device to initiate the connection with the keyboard device 130.

In step 540, the I/O and communications block 250 may receive one or more host operating system indicators from the host computing device. In some embodiments, the host operating system indicators may be received as part of the pairing process. Examples of host operating system indictors may include: a device name, services running on the host computing device, active pipes, device drivers data, and a custom pattern.

In step 550, the decision engine 270 may analyze the operating system indicators to determine the operating system running on the host computing device. The decision engine 270 may use one or more of the host operating system indicators to determine which operating system is running on the host computing device. In some embodiments, the decision engine 270 may evaluate each available or received host operating system indicator and assign a probability as to the level of assurance that each host operating system indicator indicates one operating system over another operating system.

In step 560, the decision engine 270 may determine whether the operating system running on the host computing device is determinable. The determination may be made by the decision engine 270 based on the analysis of the host operating system indicators. In some embodiments, this may involve determining a probability of the operating system associated with the host computing device based on the one or more host computing device indicators. In some embodiments, the determination may be made by the decision engine 270 when a probability of a particular operating system, calculated by the decision engine 270, reaches a minimum or predetermined threshold.

In step 570, when the decision engine 270 is able to determine the operating system running on the host computing device, the keyboard device 130 associates the determined operating system with the selected host indicator. In some embodiments, associating the selected operating system with the selected host computing device includes sending a set of keycodes from the keyboard device 130 to the host computing device, where the set of keycodes are associated with the selected operating system.

In some embodiments, when the host computing device is associated with the selected host, the connecting and pairing information can be stored in a non-volatile memory component 240. In such embodiments, after the keyboard device 130 is powered down and subsequently powered back up, the connecting and pairing information is accessed from the memory component 240 to re-enable the connection. If the selected host selector dial 130b is currently associated with a different host computing device through a previous pairing process, the connection to the previous host computing device may be dropped and the selected host selector dial 130b associated with the newly selected host computing device.

In some embodiments, the decision engine 270 may be capable of determining host computing device specific data in addition to the operating system. In such embodiments, the keyboard device 130 may determine a customized mapping of a set of input members disposed on the keyboard device 130 based on both the determined operating system and host computing device specific data. For example, the decision engine 270 may be able to distinguish between an iPhone and an iPad, even where both are running the same iOS operating system. In such embodiments, features unique to each device may be mapped to the keyboard device 130.

In step 580, the decision engine 270 determines whether there are additional host operating system indicators. When the decision engine 270 determines that there are additional host operating system indicators, the decision engine 270 may iteratively analyze each available host operating system indicator until the minimum threshold is achieved and the operating system running on the host computing device can be determined. Alternatively, when the decision engine 270 determines that there are not additional host operating system indicators, the process proceeds to step 590.

In some embodiments, the host operating system indicators received from the host computing device may be analyzed in parallel by the decision engine 270.

In step 590, when the decision engine 270 is not able to determine the operating system running on the host computing device and there are no additional host operating system indicators, the keyboard device 130 associates a default operating system with the selected host indicator. In some embodiments, an input device may have a default operating system to which it will be configured. In some embodiments, the default operating system may be determined based on operating system grouping.

In some embodiments, when the default or determined operating system is improper or incorrect, the user may modify the operating system directly by selecting the operating system manually using the appropriate operating system selection keys 130c, as stated above.

It should be appreciated that the specific steps illustrated in FIG. 5 provide a particular method 500 according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
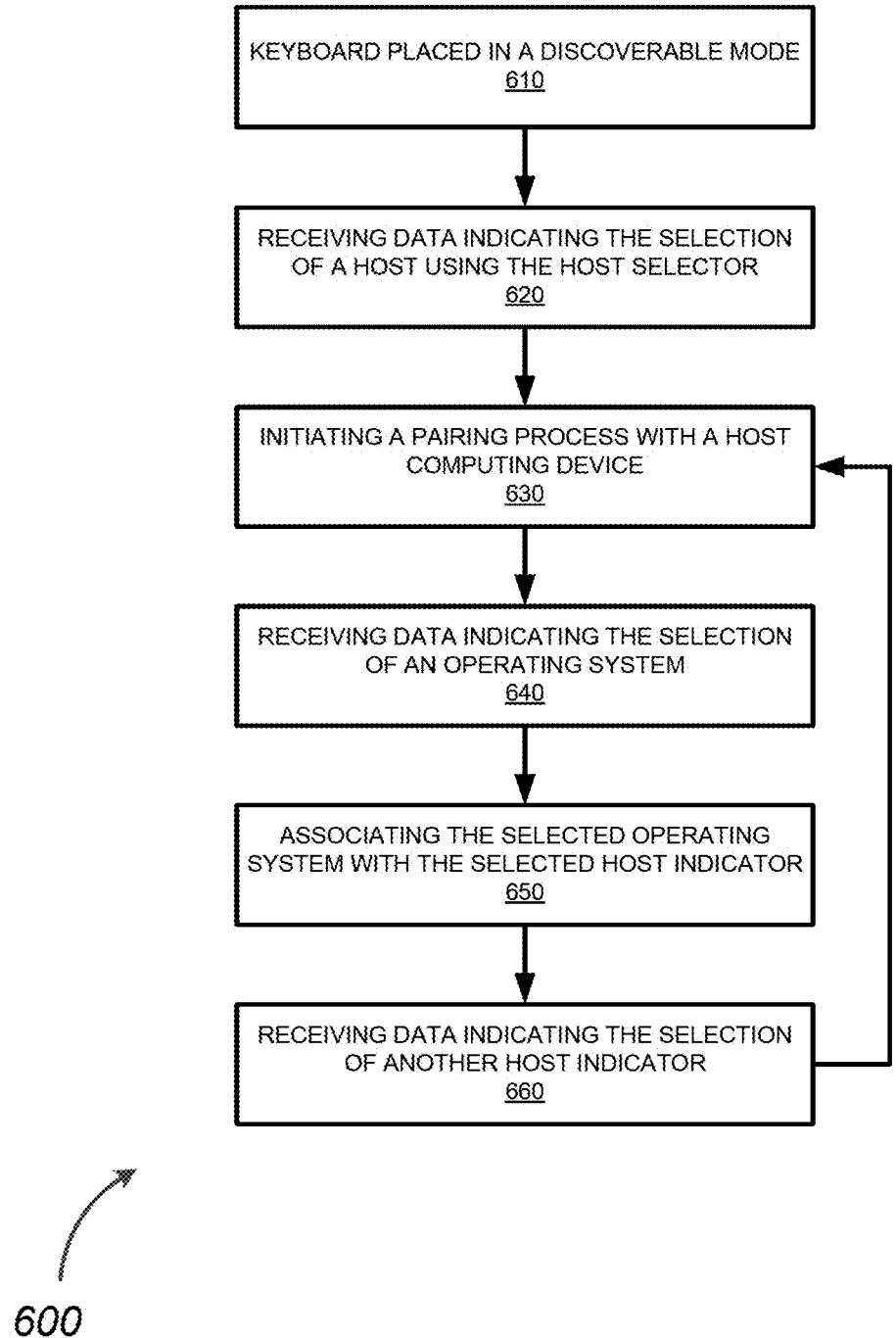
FIG. 6 is a flow diagram for establishing a pairing between a keyboard device and a host computing device using a manual operating system determination.

FIG. 6 is a flow diagram for establishing a pairing between a keyboard device 130 and a host computing device using a manual operating system selection during the pairing.

In step 610, the keyboard device 130 receives data indicating that the keyboard device has been placed in discoverable mode for pairing the keyboard device 130 with a host computing device (e.g., a computer 110, a smart phone 150, a tablet computer 160). In some embodiments, powering on the keyboard device 130 may place the keyboard device 130 automatically in discoverable mode.

In step 620, the keyboard device 130 receives data indicating a selection of a host using the host selector dial 130b. In some embodiments, the selected host may be the host selected by the host selector dial 130b prior to powering on the keyboard device 130. In some embodiments, after the power-up sequence has completed and the keyboard device 130 is already in use, the user may move the host selector dial 130b from a first host indicator to a second host indicator. The data indicating the selection of a host using the host selector dial 130b may be received via an input module 210 in the keyboard device 130.

In step 630, the keyboard device 130 initiates a pairing process with the host computing device. In some embodiments, the I/O and communications block 250 may be configured to establish a connection between the keyboard device 130 and the host computing device. In some embodiments, the pairing process may be to establish a wireless connection between the keyboard device 130 and the host computing device. In some embodiments, the wireless connection can be Bluetooth™ or any other wireless standard or proprietary wireless network protocol.

In some embodiments, the user may have to interact with the host computing device to initiate a connection with the keyboard device 130. For example, the user may have to input a code into the host computing device to confirm that the user wants to pair the keyboard device 130 with the host computing device. The user may be required to access settings in the host computing device and select the keyboard device 130 from a list of available devices. In other embodiments, the user does not have to interact with the host computing device to initiate the connection with the keyboard device 130.

In step 640, the keyboard device 130 receives data indicating a selection of an operating system, the user selecting the operating system through the operating system selection keys 130c. In some embodiments of the present invention, the input module 210 may then receive data indicating a selection of one of a plurality of operating system selection keys 130c disposed on the keyboard housing 130a of the keyboard device 130. In some embodiments, the user must select the one of the plurality of operating system selection keys 130c for a pre-established period in order to make the selection of the operating system type associated with the selected operating system selection keys 130c.

It would be understood by one of ordinary skill in the art that at any time the user can change the operating system selection "on the fly" by using the plurality of operating system selection keys 130c. In some embodiments, the user can select a new operating system using the plurality of operating system selection keys 130c while the pairing connection between the keyboard device 130 and the host computing device is maintained. This may allow the user to use the keyboard device 130 with various operating system without having to conduct a new pairing process. The user may want to change the operating system associated with a paired connection between the keyboard device 130 and the host computing device for many reasons. For example, the user may have made an incorrect operating system selection during a manual operating system determination process. In other example, the user may want to correct the operating system determined in an automatic operating system determination process. In some embodiments, the user may want to change the operating system when using a host computing device running multiple operating system environments, such as in the case of virtual machines.

In step 650, the keyboard device 130 associates the selected operating system with the selected host indicator. In some embodiments, associating the selected operating system with the selected host may include sending a set of keycodes from the keyboard device 130 to the host computing device. In some embodiments, the set of keycodes sent from the keyboard device 130 to the host computing device may be unique to the determined operating system.

In some embodiments, when the host computing device is associated with the selected host, the pairing and connecting information can be stored in a non-volatile memory component 240. In such embodiments, after the keyboard device 130 is powered down and subsequently powered back up, the host pairing and connecting information is accessed from the memory component 240 to re-enable the pairing connection. If the selected host indicator of host selector dial 130b was previously associated with a different host computing device, the connection to the previous host computing device may be dropped and the selected host indicator of host selector dial 130b associated with the newly discovered host computing device.

In step 660, the keyboard device 130 may receive data indicating the selection of a second host indicator. In some embodiments, when the keyboard device 130 receives data indicating the selection of another host, the process returns to step 630. In embodiments of the present invention, the process of establishing connections with the keyboard device 130 may be repeated for other host computing devices.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teaching provided herein, a person of ordinary skill in the art will appreciate other ways and/or methods to implement the present invention.

It should be appreciated that the specific steps illustrated in FIG. 6 provide a particular method 600 according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
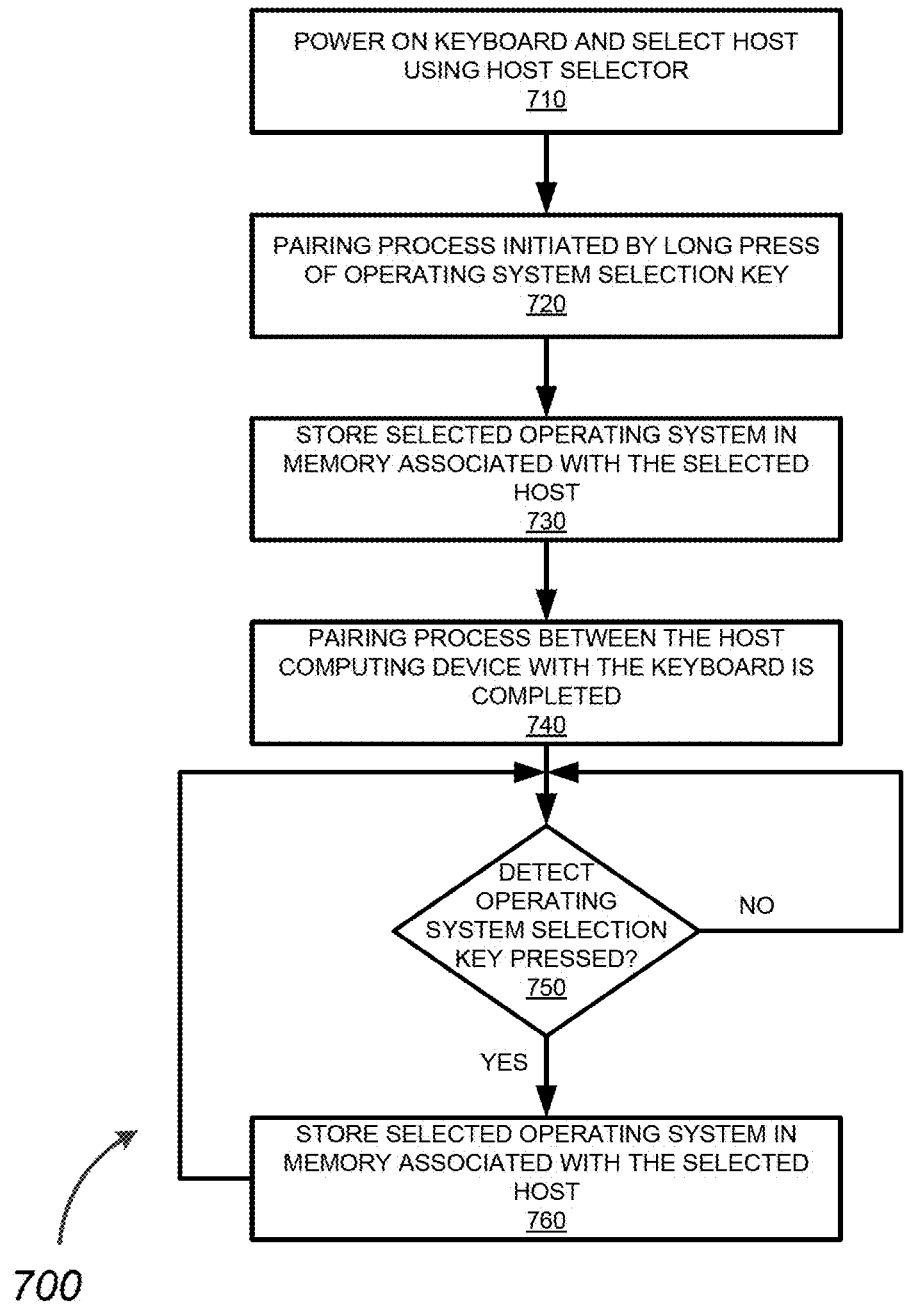
FIG. 7 is a flow diagram for an alternative method of establishing a pairing and connection between a keyboard device and a host computing device using a manual operating system determination.

FIG. 7 is a flow diagram for an alternative method of establishing a pairing and connection between a keyboard device 130 and a host computing device using a manual operating system selection, where the selection is done together with the pairing (e.g., using a long press on the operating system selection keys).

In step 710, the keyboard device 130 may be powered on by a user and the keyboard device 130 receives data indicating the selection of a host using the host selector dial 130b. In embodiments, the host selector dial 130b may be moved or switched between one or more hosts. The selected host may be the host indicator at the position the host selector dial 130b was in when the keyboard device 130 was powered on. The data indicating the selection of a host using the host selector dial 130b may be received via an input module 210 in the keyboard device 130.

In step 720, the keyboard device 130 may initiate a pairing process when the keyboard device 130 receives data indicating a long press of one of the operating system selection keys 130c. In such embodiments, the long press of one of the operating system selection keys 130c may place the keyboard device 130 in a discoverable mode for pairing the keyboard device 130 with a host computing device. In some embodiments, the long press of one of the operating system selection keys 130c may be three seconds. In other embodiments, the length of time may be greater than or less than three seconds.

In step 730, the operating system selected using the operating system selection keys 130c in step 720, is stored in the memory component 240 of the keyboard device 130. The data indicating the selected operating system may be associated with the host selected using the host selector dial 130b. In some embodiments, the storage of the operating selected using the operating system selection keys 130c may occur simultaneously with the long press of the operating system selection keys 130c, as described in step 720. The data indicating the selection of an operating system may be received via a user input (e.g., a selection of one of the operating system selection keys 130c).

In step 740, the pairing process between the host computing device and the keyboard device 130 is completed. In some embodiments, the I/O and communications block 250 may be configured to establish a connection between the keyboard device 130 and the host computing device. In some embodiments, the pairing process may be to establish a wireless connection between the keyboard device 130 and the host computing device. In some embodiments, the wireless connection can be Bluetooth™, Bluetooth LE™ or any other wireless standard or proprietary wireless network protocol. The pairing process may also include sending a set of keycodes from the keyboard device 130 to the host computing device, where the set of keycodes is based on the selected operating system running on the host computing device.

In step 750, the input module 210 in the keyboard device monitors data received from the operating system selection keys 130c to determine whether one of the operating system selection keys 130c has been selected (e.g., pressed or switched). When the input module 210 does not receive data indicating the selection of one of the operating system selection keys 130c, the input module 210 continues to monitor.

In step 760, when the input module 210 does receive data indicating the selection of one of the operating system selection keys 130c, the new operating system selected using the operating system selection keys 130c in step 750, is stored in the memory component 240 of the keyboard device 130. In some embodiments, the selection of the new operating system may be manually overridden the operating system selection made in step 720. In such embodiments, the pairing process completed in step 740 may not be affected as the host computing device and the keyboard device 130 were successfully paired. In such embodiments, the selection of the new operating system may be to associate a correct set of keycodes with the pairing connection.

It should be appreciated that the specific steps illustrated in FIG. 7 provide a particular method 700 according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives. It would be understood by one of ordinary skill in the art that in some embodiments, the selection of the operating system type can be done manually after the pairing process.

Figure 8:
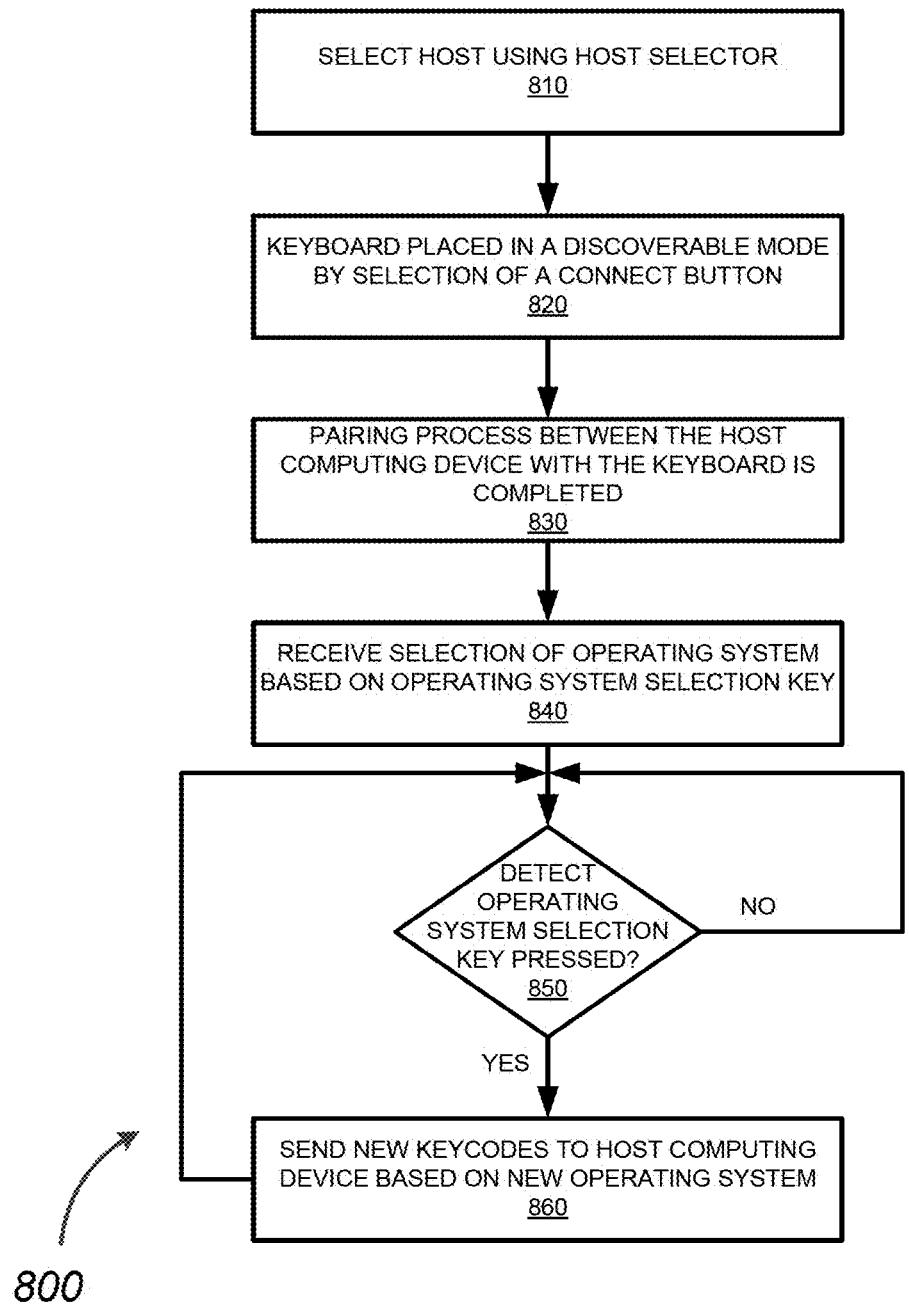
FIG. 8 is a flow diagram for an alternative method of establishing a pairing and connection between a keyboard device and a host computing device using a manual selection.

FIG. 8 is a flow diagram for an alternative method of establishing a pairing and connection between a keyboard device 130 and a host computing device using a manual selection, where the selection is after the pairing, for example, with a subsequent press or selection of the operating system selection keys 130c.

In step 810, the keyboard device 130 receives data indicating the selection of a host using the host selector dial 130b. In embodiments, the host selector dial 130b may be moved or switched between one or more hosts. The selected host may be the host indicator at the position the host selector dial 130b was in when the keyboard device 130 was powered on. The data indicating the selection of a host using the host selector dial 130b may be received via an input module 210 in the keyboard device 130.

In step 820, the keyboard device 130 receives data indicating that the keyboard device has been placed in a discoverable mode for pairing the keyboard device 130 with a host computing device (e.g., a computer 110, a smart phone 150, a tablet computer 160). The keyboard device 130 may be placed in the discoverable mode, for example, by a dedicated "Connect" button that may be disposed on the keyboard device.

In step 830, a pairing process between the host computing device and the keyboard device 130 is completed. In some embodiments, the I/O and communications block 250 may be configured to establish a connection between the keyboard device 130 and the host computing device. In some embodiments, the pairing process may be to establish a wireless connection between the keyboard device 130 and the host computing device. In some embodiments, the wireless connection can be Bluetooth™, Bluetooth LE™ or any other wireless standard or proprietary wireless network protocol. The pairing process may also include sending a set of keycodes from the keyboard device 130 to the host computing device, where the set of keycodes is based on the selected operating system running on the host computing device.

In step 840, the keyboard device 130 receives a selection of an operating system based on the selection of one of the operating system selection keys 130c. In embodiments of the present invention, the keyboard device may send a set of keycodes to the host computing device based on the operating system selected using the operating system selection keys 130c.

In step 850, the input module 210 in the keyboard device monitors data received from the operating system selection keys 130c to determine whether one of the operating system selection keys 130c has been selected (e.g., pressed or switched). When the input module 210 does not receive data indicating the selection of one of the operating system selection keys 130c, the input module 210 continues to monitor.

In step 860, when the input module 210 does receive data indicating the selection of one of the operating system selection keys 130c, the new operating system selected using the operating system selection keys 130c in step 750, is determined. In embodiments of the present invention, the keyboard device may send a new set of keycodes to the host computing device based on the new operating system. In some embodiments, the selection of the new operating system may be to manually override the operating system selection made in step 720. In such embodiments, the pairing process completed in step 740 may not be affected as the host computing device and the keyboard device 130 were successfully paired.

It should be appreciated that the specific steps illustrated in FIG. 8 provide a particular method 800 according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives. It would be understood by one of ordinary skill in the art that in some embodiments, the selection of the operating system type can be done manually after the pairing process.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teaching provided herein, a person of ordinary skill in the art will appreciate other ways and/or methods to implement the present invention.

In embodiments, any of the entities described herein may be embodied by a computer that performs any or all of the functions and steps disclosed.

It should be noted that any recitation of "an", "an" or "the" is intended to mean "one or more" unless specifically indicated to the contrary.

It is also understood that the examples and embodiments described herein are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. A system comprising:
   a host computing device running an operating system; and
   a data input device communicatively coupled to the host computing device using a method comprising:
   receiving data indicating the selection of a host computing device;
   initiating a pairing process with the host computing device through a data communications connection;

receiving data indicating the selection of a first operating system running on the host computing device;

performing a first enumeration process to associate the first operating system with the selected host computing device;

receiving data indicating the selection of a second operating system; and while maintaining the data communications connection between the data input device and the host computing device, performing a second enumeration process to associate the second operating system with the selected host computing device.

2. The system of claim 1 wherein the data input device is one of a keyboard, a mouse, or a touchpad device.

3. The method of claim 1 wherein the data communications connection is one of a Bluetooth and Bluetooth LE communications protocol.

4. The system of claim 1 wherein associating the first operating system with the selected host computing device includes determining a first customized mapping of a set of input members disposed on the data input device based on the selected first operating system.

5. The system of claim 4 wherein associating the second operating system with the selected host computing device includes determining a second customized mapping of a set of input members disposed on the data input device based on the selected second operating system.

6. A method performed by an input device, the method comprising: receiving data indicating the selection of a host computing device;

initiating a pairing process with the host computing device through a data communications connection;

receiving data indicating the selection of a first operating system running on the host computing device;

performing a first enumeration process to associate the first operating system with the selected host computing device;

receiving data indicating the selection of a second operating system; and while maintaining the data communications connection between the input device and the host computing device, performing a second enumeration process to associate the second operating system with the selected host computing device.

7. The method of claim 6 wherein the data input device is one of a keyboard, a mouse, or a touchpad device.

8. The method of claim 6 wherein the data communications connection is one of a Bluetooth and Bluetooth LE communications protocol.

9. The method of claim 6 wherein associating the first operating system with the selected host computing device includes determining a first customized mapping of a set of input members disposed on the input device based on the selected first operating system.

10. The method of claim 9 wherein associating the second operating system with the selected host computing device includes determining a second customized mapping of a set of input members disposed on the input device based on the selected second operating system.

11. An input device comprising:

one or more processors; and a non-transitory computer readable medium controlled by the one or more processors and configured to perform operations including:

receiving data indicating the selection of a host computing device;

initiating a pairing process with a host computing device through a data communications connection;

receiving data indicating the selection of a first operating system running on the host computing device;

performing a first enumeration process to associate the first operating system with the selected host computing device;

receiving data indicating the selection of a second operating system; and while maintaining the data communications connection between the input device and the host computing device, performing a second enumeration process to associate the second operating system with the selected host computing device.

12. The input device of claim 11 wherein the input device is one of a keyboard, a mouse, or a touchpad device.

13. The input device of claim 11 wherein the data communications connection is one of a Bluetooth and Bluetooth LE communications protocol.

14. The input device of claim 11 wherein associating the first operating system with the selected host computing device includes determining a first customized mapping of a set of input members disposed on the input device based on the selected first operating system.

15. The input device of claim 14 wherein associating the second operating system with the selected host computing device includes determining a second customized mapping of a set of input members disposed on the input device based on the selected second operating system.

* * * * *